United States Patent
Hollatz et al.

(10) Patent No.: US 6,333,980 B1
(45) Date of Patent: Dec. 25, 2001

(54) AUTOMATIC CALL DISTRIBUTOR AND METHOD FOR ROUTING INCOMING TELEPHONE CALLS BASED ON PROFICIENCY RATINGS OF AGENTS

(75) Inventors: Michael C. Hollatz, Villa Park, IL (US); Dan M. Righi, Mc Lean, VA (US); Joseph C. Steinlicht, Glen Ellyn; Kurt E. Sunderman, Geneva, both of IL (US)

(73) Assignee: Rockwell International Corporation, Seal Beach, CA (US)

( * ) Notice: Subject to any disclaimer, the term of this patent is extended or adjusted under 35 U.S.C. 154(b) by 0 days.

(21) Appl. No.: 08/314,189

(22) Filed: Sep. 28, 1994

(51) Int. Cl.$^7$ ...................................... H04M 3/00
(52) U.S. Cl. ........................ 379/265.12; 379/309
(58) Field of Search ........................ 379/265, 266, 379/88, 89, 67, 309, 218

(56) References Cited

U.S. PATENT DOCUMENTS

| | | | |
|---|---|---|---|
| 4,694,483 | 9/1987 | Cheung | 379/34 |
| 4,757,267 | 7/1988 | Riskin | 379/113 |
| 4,757,529 | 7/1988 | Glapa et al. | 379/244 |
| 5,008,930 | 4/1991 | Gawrys et al. | 379/210 |
| 5,046,088 | 9/1991 | Margulles | 379/211 |
| 5,062,103 | 10/1991 | Davidson et al. | 370/58.1 |
| 5,206,903 | 4/1993 | Kohler et al. | 379/309 |
| 5,276,731 | 1/1994 | Arbel et al. | 379/88 |
| 5,291,552 * | 3/1994 | Kerrigan | 379/266 |
| 5,299,260 | 3/1994 | Shaio | 379/265 |
| 5,309,513 | 5/1994 | Rose | 379/265 |
| 5,329,583 | 7/1994 | Jurgensen et al. | 379/266 |
| 5,335,269 * | 8/1994 | Steinlicht | 379/266 |
| 5,384,841 * | 1/1995 | Adams | 379/266 |

OTHER PUBLICATIONS

Automated Attendants—Let Customers Reach the Right Person Faster by Cameron Ives 07/90.
Automatic Call Distribution Services in the ROLM®CBX L. Joanne Kanow—Rolm Corporation 06/80.

* cited by examiner

Primary Examiner—Fan Tsang
(74) Attorney, Agent, or Firm—Welsh & Katz, Ltd.

(57) ABSTRACT

An automatic call distributor 100 and method for selectively connecting incoming telephone calls from telephonic units 102 to a plurality of available agents located at agent telephonic units 308 is provided. The automatic call distributor 100 includes a central processing unit 302 which controls a multiport switch 300 to interconnect the incoming telephone calls and the agent telephonic units 308. Each agent is assigned one or more agent-skill indicators indicative of the agent's skills. A proficiency rating indicative of the skill level of the agent is also assigned for each agent-skill indicator. Skill groups 110a, 110b and 110n are formed from available agents having a common agent-skill indicator. Within the skill groups, the agents are arranged by decreasing proficiency rating. Agents with identical proficiency ratings are further arranged by the amount of time each agent has been available to accept an incoming telephone call. When received, an incoming telephone call is matched with a common agent-skill indicator deemed useful in satisfying a need of the caller and a minimum proficiency rating and the telephone call is routed to the skill group associated with the matched agent-skill indicator. The telephone call is offered to the agent within the skill group having the highest proficiency rating and, amongst the agents having an identical proficiency rating, having been available for the longest time.

22 Claims, 3 Drawing Sheets

AUTOMATIC CALL DISTRIBUTOR AND METHOD FOR ROUTING INCOMING TELEPHONE CALLS BASED ON PROFICIENCY RATINGS OF AGENTS

BACKGROUND OF THE INVENTION

The present invention relates generally to automatic call distributors and, more particularly, to an automatic call distributor and method for selecting one of a plurality of available agents to receive an incoming telephone call based on agent skills wherein the available agents are grouped into skill groups comprised of available agents having a common agent; skill. The agents within a skill group are further arranged by proficiency in the common agent skill.

Automatic call distributors (ACDs) are becoming increasingly utilized by businesses to automatically route incoming telephone calls to available agents. Some ACDs route incoming telephone calls based on the skills of the agents and the needs of the external callers. When agents having the necessary skills are unavailable, the customer is placed in one or more queues to wait for an available agent or is connected to an agent having somewhat related skills.

One method for automatic call distribution is disclosed in U.S. Pat. No. 5,206,903 issued to Kohler et al. In the Kohler et al. method, each agent is assigned up to four skill numbers that represent various skills of the agent. For an agent having more than four skills, artificial skill numbers are used. In a travel agency, for example, agents may have knowledge of the cities, sites, etc. of one or more states. To accommodate agents having knowledge of more than four states, the Kohler method provides for the assignment of artificial skill numbers representing a group of states, such as the New England states.

Upon arrival of an incoming call, the call is assigned up to three prioritized skill numbers representative of the estimated skill requirements of the calling party. A first group of agents are then searched in an attempt to match the first prioritized skill number of the call with an available agent having that skill number. Failing to find a match of the first skill number, a second search is conducted for an available agent having either the first or second skill number.

If a match still has not been found, a search of the first group of agents is made for an agent having either the first, second or third skill number. If after the third search the incoming caller is not yet connected with an appropriate agent, a second group of agents is searched for a predetermined, artificial skill number designating general knowledge in the desired area while the first group of agents continues to be searched for either the first, second or third skill number.

The Kohler et al. method routes calls to those agents having the desired skill number on a time available basis If more than one agent having the desired skill is available, the agent who has been available for the longest period of time is connected to the caller. Unfortunately, the agent who has been available for the longest period of time may not have the highest proficiency in the desired skill amongst the available agents. Consequently, the caller may not be connected to the most informed agent.

As will be readily apparent to those skilled in the art, the agent selection process disclosed in Kohler et al. may result in undesirable time delays as the agents are searched for a correct match. Since the Kohler et al. method searches all of the agents in a group at each level of searching, the system may take an inordinately long time to match caller skill requirements to agent skills, especially if each group has a large number of agents. The Kohler et al. method will search all the agents in the first group for all three skill numbers even if all the agents in the group are unavailable. Further, even after this extended time period, the caller may be connected to an agent having an artificial skill number and, therefore, possibly only a cursory knowledge of the subject matter of the call.

Accordingly, there is a need for an improved automatic call distributor and method for grouping available agents by skills and for arranging the agents by proficiency in those skills such that the incoming caller is connected, in a timely fashion, to the available agent who has the highest proficiency in the specific skill deemed necessary to handle the call.

SUMMARY OF THE INVENTION

This need is met by the automatic call distributor and method in accordance with the present invention wherein agents are grouped into skill groups by agent skills and are further arranged within the skill group by proficiency in those skills. Agents having the same proficiency in a skill are further arranged within a skill group by the amount of time each agent has been available.

In accordance with one aspect of the present invention, each agent is assigned one or more agent-skill indicators indicative of one or more skills of the agent. A proficiency rating is associated with each agent-skill indicator. Skill groups are formed of available agents having a common agent-skill indicator. Available agents are those agents presently able to accept an incoming telephone call. For example, each available agent fluent in French is grouped into a single skill group. Agents may be members of more than one skill group. Unavailable agents who are presently unable to accept incoming telephone calls are removed from all queues of the skill groups until they become available.

Computer means detects the skill requirements of the callers and the minimum proficiency that is acceptable to answer the call and routes the incoming telephone calls to agents grouped in skill groups based on these skill requirements and minimum proficiency via connecting means. Computer means also detects when agents are available and unavailable and forms the skill groups of available agents. Agents within a skill group are arranged by descending proficiency ratings. The agent in the skill group with the highest proficiency rating receives the next telephone call to the skill group. Agents having a common proficiency rating in a skill group are further arranged by decreasing time of availability. Timing means in the computer means detects the length of time each agent has been available. Thus, the agent the highest proficiency rating within the skill group, if it is above the minimum proficiency rating, and has been available the longest time, amongst those agents having the highest proficiency rating, receives the next incoming telephone call to the skill group.

In accordance with another aspect of the present invention, a method for selecting one of a plurality of agents to receive an incoming telephone call from a caller is provided. The method comprises the steps of: associating at least one agent-skill indicator with each of the agents, the agent-skill indicator being representative of at least one skill of each of the agents; grouping the agents into skill groups based on the agent-skill indicators; assigning a proficiency rating for each of the agent-skill indicators associated with each of the agents, the proficiency rating being representative of the proficiency of each of the agents in the skill represented by the agent-skill indicator; identifying a call-skill indicator deemed useful in satisfying a need of the caller; matching the call-skill indicator of the caller with one of the agent-skill indicators, the matched agent-skill indicator having a corresponding matched skill group; and connecting one of the agents in the matched skill group to the caller based on the proficiency rating of the connected agent.

Preferably, the method comprises the step of selecting a minimum proficiency rating for the caller and connecting one of the agents in the matched skill group to the caller if the proficiency rating of the connected agent is not less than the minimum proficiency rating.

In accordance with yet another aspect of the present invention, a method for routing incoming telephone calls from a caller to one of a plurality of available agents is provided. The method comprises the steps of: associating at least one agent-skill indicator with each of the available agents, an agent-skill indicator being representative of a skill of an agent; associating a proficiency rating with each agent-skill indicator associated with each of the agents, the proficiency rating being representative of the proficiency of each of the agents in the skill associated with each agent-skill indicator; forming a skill group for each agent-skill indicator comprised of available agents having a common agent-skill indicator associated therewith; detecting a length of time each of the available agents have been available; identifying a call-skill indicator deemed useful in satisfying a need of the caller; matching the call-skill indicator with one of the skill groups comprised of available agents having a common agent-skill indicator which corresponds to the call-skill indicator; and connecting one of the available agents in the matched skill group to the caller based on the proficiency rating and the length of time of availability of agents in the matched skill group.

These and other features and advantages of the present invention will become apparent from the following detailed description, the accompanying drawings and the appended claims.

DETAILED DESCRIPTION OF THE INVENTION

Figure 1:
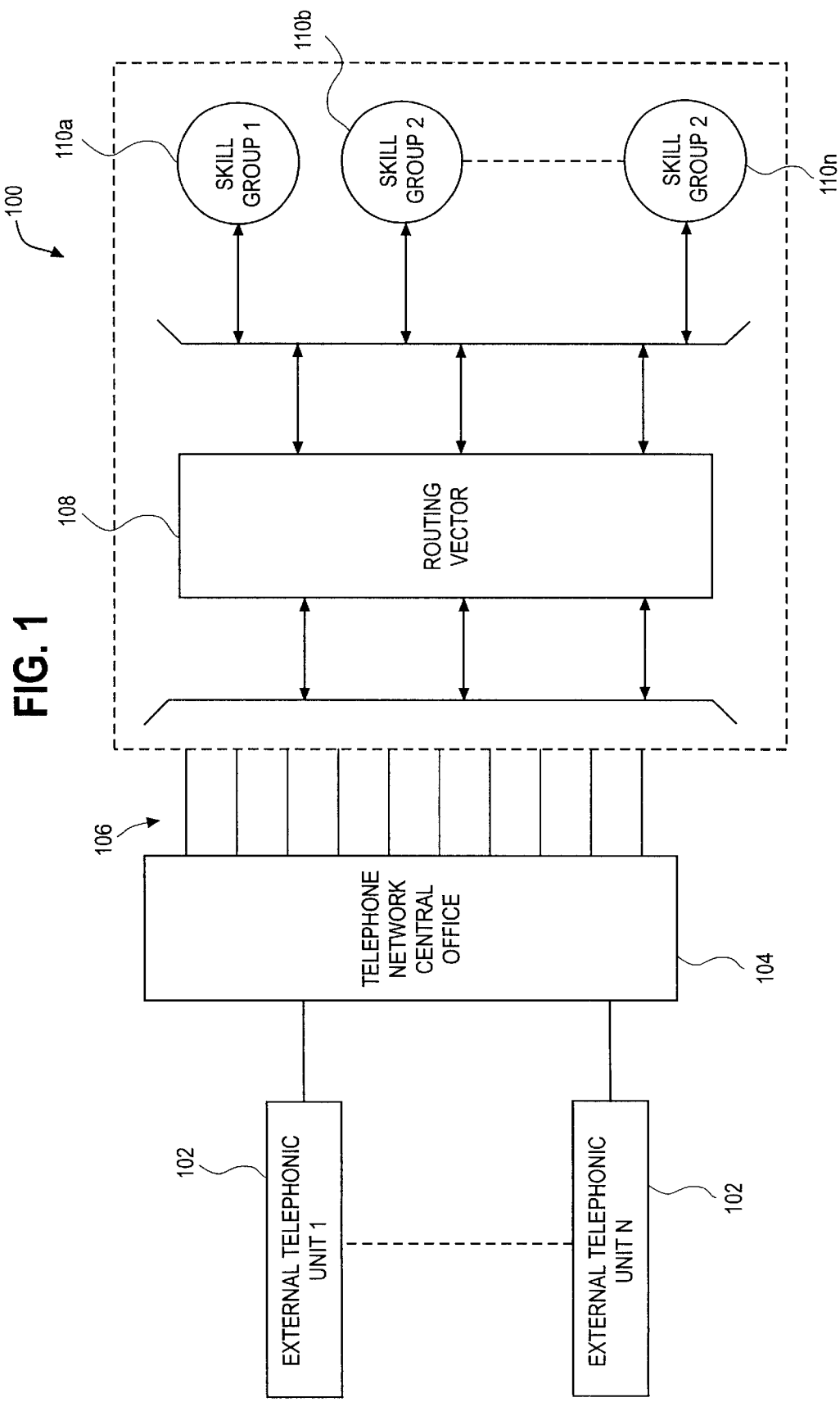
FIG. 1 is a schematic diagram of an automatic call distributor (ACD) in accordance with the present invention.

In accordance with the present invention, an automatic call distributor (ACD) 100 selectively connects incoming telephone calls from callers to a plurality of agents, as shown schematically in FIG. 1. The callers use a plurality of conventional external telephonic units 102 which are connected to a telephone network central office 104 to place telephone calls. The telephone calls are transmitted, in turn, over telephone trunks 106 to the ACD 100.

In the ACD 100, a routing vector 108 routes the incoming calls to selected ones of skill groups 1–N which are designated 110a, 110b and 110n. As those skilled in the art will readily comprehend, the routing vector 108 is representative of the various, conventional software based devices within an ACD for routing telephone calls. Further, it should be understood that the number of skill groups are only limited by practicality and do not necessarily have to be an equal number.

The routing vector 108 routes incoming telephone calls based on a number of well known methods. For example, an incoming telephone call may be routed based on information provided by the telephone network central office 104. The telephone network central office 104 may provide dialed number identification system (DNIS) information identifying a destination telephone number dialed by the external caller. The telephone network central office 104 may further provide automatic number identification (ANI) information which identifies an origin telephone number representative of the external telephonic unit 102 used by the caller to place the incoming telephone call. Additionally, the incoming telephone call may be routed based on the particular telephone trunk 106 over which the call is transmitted to the ACD 100.

To obtain further information, the ACD 100 may request that the external caller provide predetermined information, such as an account number or the type of call (i.e. sales, inventory, billing, etc.). The incoming telephone call is thereafter routed based on the predetermined information provided by the caller. Since such methods for detecting information relating to incoming telephone calls are well known and are not integral to the present invention beyond obtaining information to route incoming telephone calls to appropriate agent skill groups and for determining a minimum proficiency level which is discussed below, details of such methods will not be further disclosed herein. It should be understood, however, that numerous methods for detecting one or more needs of the caller may be advantageously employed in the present invention.

Figure 3:
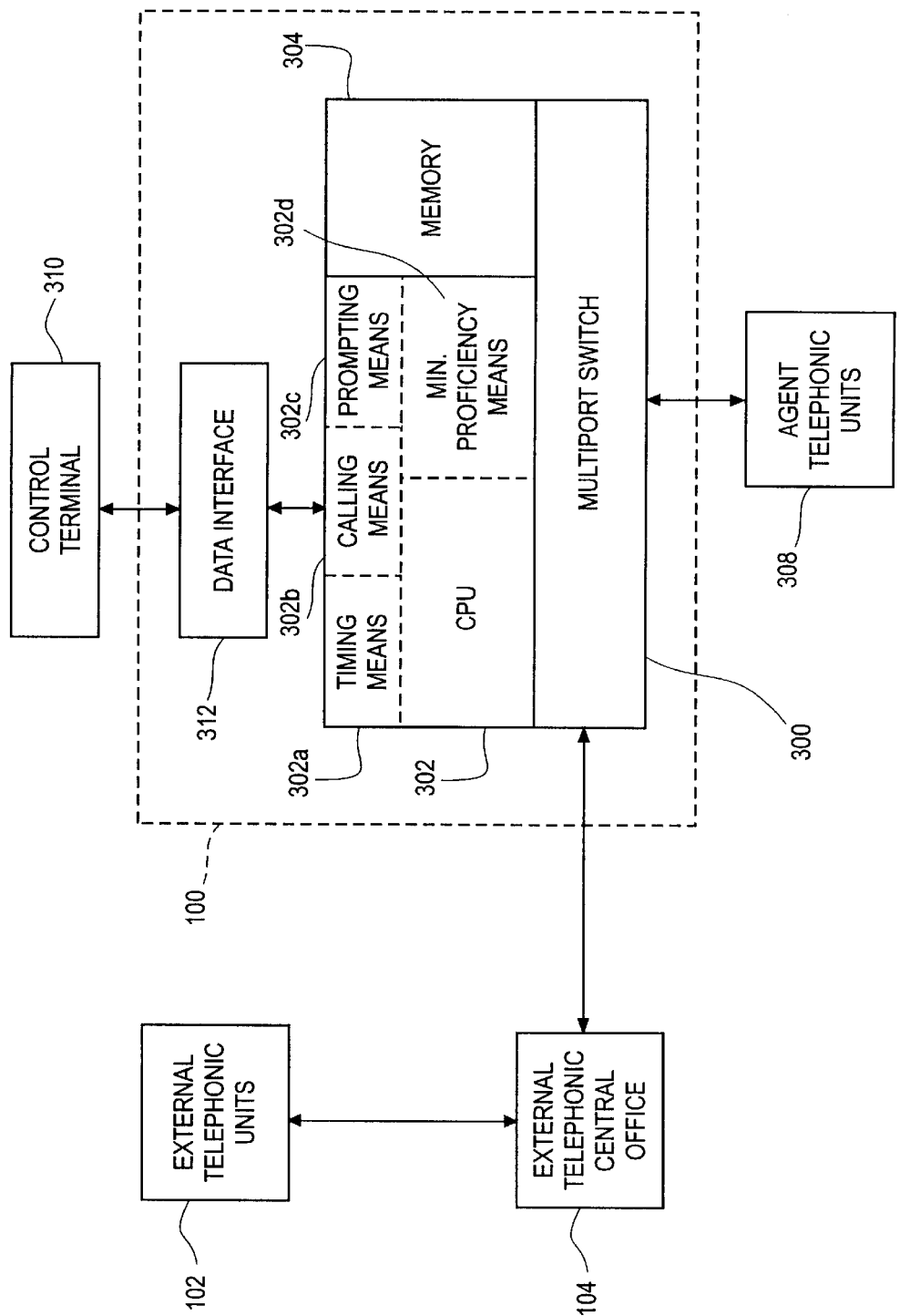
FIG. 3 is a schematic diagram of an exemplary hardware configuration of the ACD shown in FIG. 1 in accordance with the present invention.

An exemplary hardware configuration of the ACD 100 is shown in FIG. 3. The ACD 100 includes connecting means comprised of a multiport switch 300 controlled by computer means, shown as a central processing unit (CPU) 302, in conjunction with an associated memory 304. The ACD 100 receives incoming telephone calls initiated by the external telephonic units 102 and distributes the incoming telephone calls received at the multiport switch 300 to agents stationed at agent telephonic units 308.

The CPU 302 is the primary controller for the ACD 100. The CPU 302 retrieves the routing vector 108 stored in the memory 304 and executes the routing vector 108 to control the routing of incoming telephone calls via the multiport switch 300. The switch may have around 3,000 I/O ports for connection to the agent telephonic units 308.

An operator communicates with the CPU 302 through the control terminal 310 via a data interface 312. The operator typically has the capability of retrieving data from the CPU 302, entering data in the memory 306 and modifying the routing vector 108. Although not shown, it should be readily apparent to those skilled in the art that the agent telephonic units 308 may also include a computer terminal for retrieving data from and entering data into the ACD 100.

The present invention can be implemented in numerous types and sizes of systems for distributing calls to selected agents. However, some preferred types of call distribution systems are disclosed in U.S. Pat. No. 5,268,903, issued to Jones et al. on Dec. 7, 1993, entitled "Multichannel Telephonic Switching Network With Different Signaling Formats and Connect/PBX Treatment Selectable For Each Channel"; U.S. Pat. No. 5,140,611, issued to Jones et al. on Aug. 18, 1992, entitled "Pulse Modulated Self-Clocking and Self-Synchronizing Data Transmission and Method for a Telephonic Communication Switching System"; and U.S. Pat. No. 5,127,004, issued to Lenihan et al. on Jun. 30, 1992, entitled "Tone and Announcement Message Code Generator for a Telephonic Switching System and Method", the disclosures of which are hereby incorporated by reference.

Figure 2:
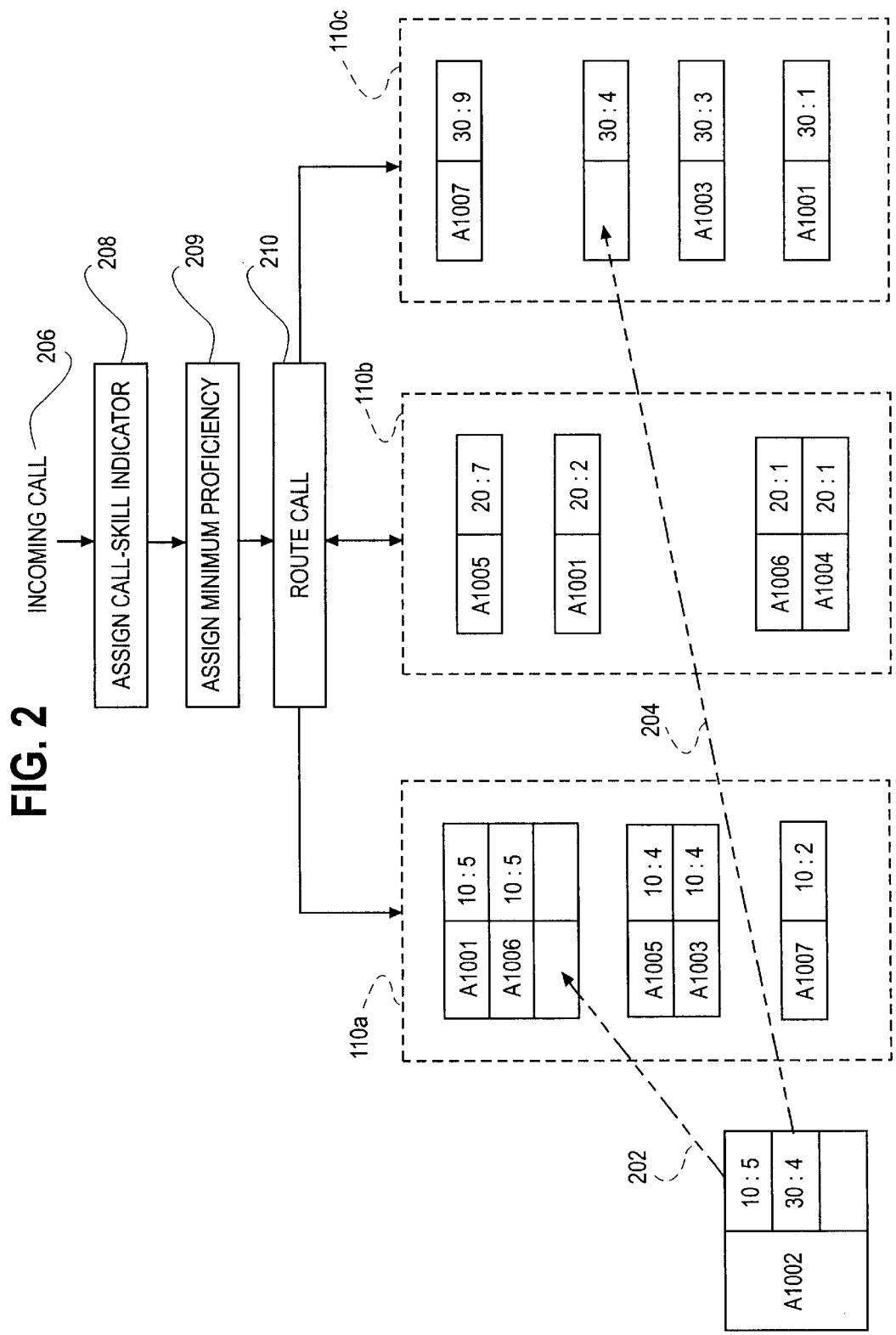
FIG. 2 is a flow chart showing routing of a telephone call and the grouping of agents in the ACD shown in FIG. 1 in accordance of the present invention.

The operation of a portion of the ACD 100, and more specifically the CPU 302, will now be discussed in detail with reference to FIG. 2. Initially, each agent is assigned one or more agent-skill indicators, such as agent-skill numbers, representative of one or more corresponding skills of the agent. The agent-skill indicators may, for example, be entered by a supervisor through the control terminal 310. The agents are then grouped into skill groups 110a, 110b and 110n based on their respective agent-skill indicators. In FIG. 2, the three skill groups 110a, 110b and 110n are shown comprised of currently available agents A1001, A1003, A1004, A1005, A1006 and A1007. Each skill group 110a, 110b and 110n is comprised of agents having a common agent-skill indicator. For example, each of the agents in the skill group 110a have an agent-skill indicator 10 representing that they are fluent in Spanish. Similarly, the agents in the skill group 110b have common agent-skill indicator 20 indicating fluency in English. The agents in the skill group 110n have common agent-skill indicator 30 indicating fluency in French. As is apparent, an agent may have more than one agent-skill indicator and, therefore, be a member of more than one skill group.

A proficiency rating is assigned for each agent-skill indicator associated with an agent. The proficiency rating is indicative of the agent's proficiency in the skill represented by the agent-skill indicator. In FIG. 2, agent A1001 has a proficiency rating of 5 for the common agent-skill indicator 10 (Spanish) of the skill group 110a. Similarly, agents A1005 and A1003 have proficiency ratings of 4 in Spanish and agent A1007 has a proficiency rating of 2 in Spanish.

The agents are arranged in each of the skill groups 110a, 110b and 110n by proficiency rating such that an available agent having the highest proficiency rating in the common agent-skill indicator of the group will receive the next telephone call routed to the skill group. Available agents having identical proficiency ratings in a common agent-skill indicator are further arranged by the amount of time they have been available to accept incoming telephone calls. The CPU 302 includes timing means 302a for detecting the amount of time an agent has been available. Thus, in FIG. 2, even though agents A1001 and A1006 have the same proficiency rating 5 in Spanish, the agent A1001 will receive the next telephone call routed to the skill group 110a since the agent A1001 has been available for the longer time. Detecting the amount of time an agent has been available and arranging the agents within a skill group is readily accomplished by those skilled in the art using conventional programming techniques, or conventional electronic circuitry, and, consequently, will not be further discussed herein.

The present invention thereby assures that an available agent in a skill group having the highest proficiency rating receives the next telephone call routed to the skill group. The present invention further assures that, among available agents in a skill group who share the highest proficiency rating, the agent having been available for the longest length of time will receive the next telephone call routed to the skill group. The present invention also selects a minimum proficiency ratings for certain incoming telephone calls such that an agents having proficiency ratings lower than the minimum proficiency ratings will not receive the calls.

In FIG. 2, agents A1001, A1005 and A1007 will receive the next telephone calls routed to respective skill groups 110a, 110b and 110n. When an agent accepts a call or is otherwise unavailable, the agent is removed from all queues of the skill groups. An unavailable agent, such as agent A1002, being an agent who is presently unable to accept incoming telephone calls.

When the agent A1002 becomes available, the CPU 302 is notified either through the control terminal 310 or through the agent telephonic unit 308. The agent A1002 is then placed into the skill groups corresponding to the agent-skill indicators associated with the agent A1002. As represented by dashed arrows 202 and 204, agent A1002 will be inserted into respective skill groups 110a and 110n when available. Agent A1002 will be inserted into each of the skill groups 110a and 110n based on its proficiency rating for the common agent-skill indicators of the respective skill groups 110a and 110n. In the skill group 110n, for example, the agent A1002 has a proficiency rating of 4 and is therefore inserted between the agent A1007 having a proficiency rating of 9 and the agent A1003 having a proficiency rating of 3.

If the agent A1002 has the same proficiency rating as other available agents in the skill group, these agents are arranged by the amount of time each has been available. In FIG. 2, the agent A1002 has a proficiency rating of 5 for the common agent-skill indicator 10 of the skill group 110a. However, available agents A1001 and A1006 also have a proficiency rating of 5 and are already residing in the skill group 110a. Agents A1001, A1002, and A1006 are then arranged by length of time of availability. Agent A1002 who has only recently became available would therefore be placed behind agents A1001 and A1006 in the skill group 110a. Thus, each skill group continuously contains all of the available agents having the common agent-skill indicator in order of decreasing proficiency. Agents having identical proficiency within a skill group are further arranged by length of time of availability.

When an incoming call is received at 206, a call-skill indicator representative of a skill deemed useful in satisfying one or more needs of the caller is identified at 208. As noted above, the call-skill indicator is typically based on DNIS; information, ANI information, telephone trunk identification or information provided by the caller. The CPU 302 may include a conventional calling means 302b which detects and decodes the DNIS information for use by the CPU 302. Prompting means 302c may be provided in the CPU 302 for prompting the caller for additional information. The calling means 302b and the prompting means 302c are preferably software based and well known in the art. The call-skill indicator is then matched with one of the common agent-skill indicators and its corresponding skill group.

The CPU 302 may also assign a minimum proficiency rating, at step 209, for the telephone call. The minimum proficiency rating is typically based on DNIS information, ANI information, telephone trunk identification or information provided by the caller. Minimum proficiency means 302d, which is preferably software based, selects a minimum proficiency rating for one or more telephone calls based on this information.

The telephone call is then routed to the matched skill group and to the agent in the skill group who is to receive the next telephone call. If the agent in the skill group does not have a proficiency rating at least equal to the minimum proficiency rating, the telephone call is placed in queue until an agent having a high enough proficiency rating becomes available in that skill group. Similarly, if no available agents are currently in the skill group, the call is placed in queue to the skill group until an agent in the skill group becomes available. The call is thus connected to an available agent having a high proficiency, at least as high as the minimum proficiency rating, in the desired skills without unnecessary, and time wasting, searching of unavailable agents or agents with undesired skills.

It is possible that two calls may be placed in common queue waiting for an available agent in a single skill group. Preferably, the call received first by the ACD will receive the first available agent in the skill group. If two calls are in queues for two different skill groups and an available agent enters both skill groups, there are numerous ways to determine priority for the calls. For instance, the call first received by the ACD may be connected to the agent or the skill groups may be prioritized and the call routed to the higher prioritized skill group is connected to the agent.

Having thus described the invention in detail by way of reference to preferred embodiments thereof, it will be apparent that other modifications and variations are possible without departing from the scope of the invention defined in the appended claims. For example, the ACD may have hardware design configurations which depart from those described herein.

What is claimed is:

1. A method for selecting one of a plurality of agents to receive an incoming telephone call from a caller, the method comprising the steps of:

associating at least one agent-skill indicator with each of the agents, the agent-skill indicator being representative of at least one skill of each of the agents;

grouping the agents into skill groups based on the agent-skill indicators;

assigning a proficiency rating for each of the agent-skill indicators associated with each of the agents, the proficiency rating being representative of the proficiency of each of the agents in the skill represented by the agent-skill indicator;

identifying a call-skill indicator deemed useful in satisfying a need of the caller;

matching the call-skill indicator with one of the at least one agent-skill indicator, the matched agent-skill indicator having a corresponding matched skill group; and connecting one of the agents in the matched skill group to the caller based on the proficiency ratings of the agents in the matched skill group.

2. The method as recited in claim 1 wherein the step of connecting one of the agents comprises the step of connecting an agent having a highest proficiency rating in the matched skill group.

3. The method as recited in claim 1 comprising the step of assigning a minimum proficiency rating to the caller, and wherein the step of connecting one of the agents comprises the step of connecting an agent having a highest proficiency rating in the matched skill group when the highest proficiency rating is not less than the minimum proficiency rating.

4. The method as recited in claim 1 comprising the steps of detecting a length of time during which each of the agents have been available, an available agent being an agent that is presently able to accept incoming telephone calls; and wherein the step of connecting one of the agents further comprises the step of connecting one of the agents based on the length of time of availability.

5. The method as recited in claim 4 comprising the steps of:

determining which of the agents are unavailable, an unavailable agent being an agent that is presently unable to accept incoming telephone calls;

removing the unavailable agents from queues of the skill groups;

detecting when each of the unavailable agents becomes available to accept incoming telephone calls; and inserting each of the detected available agents into the skill groups.

6. The method as recited in claim 5 comprising the step of placing the caller in queue to the matched skill group when no available agents are contained in the matched skill group.

7. The method as recited in claim 1 wherein the step of identifying a call-skill indicator comprises the steps of:

detecting a telephone number called by the caller; and selecting the call-skill indicator based on the telephone number.

8. The method as recited in claim 1 wherein the step of identifying a call-skill indicator comprises the steps of:

detecting a destination telephone number called by the caller;

detecting an origin telephone number associated with a telephonic unit used by the caller to place the incoming telephone call; and selecting the call-skill indicator based on the destination and origin telephone numbers.

9. The method as recited in claim 1 wherein the step of identifying a call-skill indicator comprises the steps of:

prompting the caller to provide predetermined information; and using the information to select the call-skill indicator.

10. In an automatic call distributor, a method for routing an incoming telephone call from a caller to one of a plurality of available agents, an available agent being an agent presently able to accept an incoming telephone call, comprising the steps of:

associating at least one agent-skill indicator with each of the available agents, an agent-skill indicator being representative of a skill of an agent;

associating a proficiency rating with each agent-skill indicator associated with each of the agents, the proficiency rating being representative of the proficiency of each of the agents in the skill associated with each agent-skill indicator;

forming a skill group for each agent-skill indicator comprised of available agents having a common agent-skill indicator associated therewith;

detecting a length of time each of the available agents have been available;

identifying a call-skill indicator deemed useful in satisfying a need of the caller;

matching the call-skill indicator with one of the skill groups comprised of available agents having a common agent-skill indicator which corresponds to the call-skill indicator; and connecting one of the available agents in the matched skill group to the caller based on the proficiency rating and the length of time of availability of agents in the matched skill group.

11. The method as recited in claim 10 wherein the step of connecting one of the available agents comprises the step of connecting an agent having a highest proficiency rating in the matched skill group.

12. The method as recited in claim 10 comprising the step of assigning a minimum proficiency rating to the caller, and wherein the step of connecting one of the available agents comprises the step of connecting one of the available agents in the matched skill group to the caller based on the proficiency rating, the minimum proficiency rating and the length of time of availability of agents in the matched skill group.

13. The method as recited in claim 12 comprising the steps of:

determining when each of the available agents becomes unavailable, an unavailable agent being an agent that is presently unable to accept incoming telephone calls;

removing the unavailable agents from corresponding skill groups;

detecting when unavailable agents become available to accept incoming telephone calls; and inserting each of the detected available agents into corresponding skill groups.

14. The method as recited in claim 13 comprising the step of placing the caller in queue to the matched skill group when no available agents are contained in the matched skill group.

15. The method as recited in claim 10 wherein the step of identifying a call-skill indicator comprises the steps of::

detecting a telephone number called by the caller; and selecting the call-skill indicator based on the telephone number.

16. The method as recited in claim 10 wherein the step of identifying a call-skill indicator comprises the steps of:

detecting a destination telephone number called by the caller;

detecting an origin telephone number associated with a telephonic unit used by the caller; and selecting the call-skill indicator based on the destination and origin telephone numbers.

17. The method as recited in claim 10 wherein the step of identifying a call-skill indicator comprises the steps of:

prompting the caller to provide predetermined information; and using the information to select the call-skill indicator.

18. An automatic call distributor for connecting an incoming telephone caller with one of a plurality of agents, some of the agents being available to accept an incoming telephone call, the call distributor comprising:

computer means for detecting skill requirements required to satisfy a need of the incoming telephone caller, for specifying skills possessed by each of the agents, for specifying a proficiency rating for each of the skills of the agents, the proficiency rating being indicative of the proficiency of each agent in each of its possessed skills, for forming skill groups of available agents for each of the skills of the agents whereby each of the skill groups has one skill common to all of the agents therein, and for matching the skill requirements of the incoming telephone caller to one of the skill groups based on the one common skill of the matched skill group; and connecting means responsive to the computer means for connecting the incoming telephone caller to one of the agents in the matched skill group based on the proficiency rating of the one agent.

19. The automatic call distributor as recited in claim 18 wherein the computer means comprises minimum proficiency means for assigning a minimum proficiency to the incoming telephone caller, and wherein the connecting means connects the incoming telephone caller to one of the agents in the matched skill group based on the minimum proficiency rating of the incoming telephone caller and the proficiency rating of the one agent.

20. The automatic call distributor as recited in claim 19 wherein the computer means comprises:

timing means for detecting a length of time during which each of the available agents have been available; and wherein the computer means connects via the connecting means the incoming telephone caller to one of the agents in the matched skill group based on the length of time the connected agent has been available.

21. The automatic call distributor as recited in claim 19 wherein the computer means comprises:

calling means for detecting a destination telephone number called by the incoming telephone caller, and wherein the computer means determines the skill requirements of the caller based on the destination telephone number.

22. The automatic call distributor as recited in claim 19 wherein the computer means comprises:

prompting means for prompting the caller to provide predetermined information; and wherein the computer means uses the information to detect the skill requirements of the caller.

* * * * *